(12) United States Patent
Yoon et al.

(10) Patent No.: US 11,996,029 B2
(45) Date of Patent: May 28, 2024

(54) DISPLAY DEVICE AND POWER MANAGEMENT DEVICE FOR SUPPLYING POWER TO DISPLAY DEVICE

(71) Applicant: LX Semicon Co., Ltd., Daejeon (KR)

(72) Inventors: Seong Sik Yoon, Daejeon (KR); Hong Kyu Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 45 days.

(21) Appl. No.: 17/857,692

(22) Filed: Jul. 5, 2022

(65) Prior Publication Data

US 2023/0005411 A1 Jan. 5, 2023

(30) Foreign Application Priority Data

Jul. 5, 2021 (KR) .................. 10-2021-0087848

(51) Int. Cl.
*G09G 3/20* (2006.01)
*G06F 3/041* (2006.01)

(52) U.S. Cl.
CPC ......... *G09G 3/2092* (2013.01); *G06F 3/0412* (2013.01); *G09G 2330/021* (2013.01); *G09G 2330/026* (2013.01); *G09G 2330/027* (2013.01)

(58) Field of Classification Search
CPC .. G09G 3/2092; G09G 5/00; G09G 2330/021; G09G 2330/026; G09G 2330/027; G09G 2330/028; G09G 2330/02; G09G 2340/0435; G06F 1/3262; G06F 1/3265; G06F 3/0412; G06F 3/04166; G06F 3/0416; H02M 1/32; H02M 1/36; H02M 1/3203; H02M 3/04
See application file for complete search history.

(56) References Cited

U.S. PATENT DOCUMENTS

| | | | |
|---|---|---|---|
| 2018/0052432 A1* | 2/2018 | Kim | G06F 1/263 |
| 2019/0121476 A1* | 4/2019 | Jang | G09G 3/20 |
| 2021/0389793 A1* | 12/2021 | Baek | G06F 1/10 |
| 2022/0189428 A1* | 6/2022 | Kitagawa | G09G 3/3674 |

FOREIGN PATENT DOCUMENTS

| | | |
|---|---|---|
| JP | 6057462 B2 | 1/2017 |
| KR | 10-1615813 B1 | 5/2016 |
| KR | 2019-0047553 A | 5/2019 |

* cited by examiner

*Primary Examiner* — David Tung
(74) *Attorney, Agent, or Firm* — POLSINELLI PC

(57) ABSTRACT

The present disclosure relates to a technology for supplying power to a display device and provides a device which checks a control value for each mode stored in a memory according to a mode indication signal in a simple form received from an external device and controls operation states of power converting circuits in each mode according to the control value for each mode.

20 Claims, 7 Drawing Sheets

DISPLAY DEVICE AND POWER MANAGEMENT DEVICE FOR SUPPLYING POWER TO DISPLAY DEVICE

CROSS REFERENCE TO RELATED APPLICATION

This application claims priority from Republic of Korea Patent Application No. 10-2021-0087848 filed on Jul. 5, 2021, which is hereby incorporated by reference in its entirety.

BACKGROUND

1. Field of Technology

The present disclosure relates to a display device.

2. Description of the Prior Art

A display device includes a power management device. The power management device is also referred to as a power management integrated circuit abbreviated to PMIC.

The power management device performs a function of converting system power, supplied from a commercial power source, battery or the like, into power suitable for the characteristics of components included in a display device, and supplying the power. For example, when the voltage level of the system power is different from the operation voltage levels of the respective components, the power management device converts the voltage level of the system power into the levels of the respective operation voltages, and supplies the system power to the respective components.

Depending on a mode of the display device, some components may not operate or use a different type of power. Thus, various attempts are made to minimize the power consumption of the display device, or specifically the power management device, by using a component which does not operate depending on a mode or uses a different type of power.

SUMMARY OF THE INVENTION

In this background, in one aspect, various embodiments are directed to providing a technology capable of reducing power consumption of a display device.

In another aspect, various embodiments are directed to providing a technology capable of changing the mode of a power management device at high speed, such that a power management device can optimize an output for each mode.

In still another aspect, various embodiments are directed to providing a technology capable of minimizing a malfunction of a power management device by stably transmitting/receiving signals to/from a power management device.

In one aspect, an embodiment may provide a power management device comprising: one or more input terminals configured to receive a first mode indication signal and a second mode indication signal in different time periods; a plurality of output terminals connected to different components of a display device; a plurality of power converting circuits configured to output different types of power to the plurality of output terminals; a memory configured to store control values for respective power converting circuits regarding respective modes; and a control circuit configured to acquire first mode control values of the respective power converting circuits from the memory according to the first mode indication signal and control operation states of the respective power converting circuits to be a first state according to the first mode control values, and to acquire second mode control values of the respective power converting circuits from the memory according to the second mode indication signal and change the operation states of the respective power converting circuits to a second state according to the second mode control values.

In another aspect, an embodiment may provide a display device including: a display driving device configured to perform at least some functions for driving a display panel; a timing controller configured to output a first mode indication signal in a first time period and to output a second mode indication signal in a second time period; and a power management device including a first power converting circuit connected to the display driving device through a first output terminal and configured to acquire a first mode control value from a memory according to the first mode indication signal, to acquire a second mode control value from the memory according to the second mode indication signal, to control an operation state of the first power converting circuit according to the first mode control value in the first time period, and to control an operation state of the first power converting circuit according to the second mode control value in the second time period.

According to the present embodiments, it is possible to minimize the power consumption of the display device. Furthermore, since the modes of the power management device are quickly changed, the output of the power management device for each mode may be optimized. Furthermore, since the signal transmission/reception to/from the power management device is stable, a malfunction of the power management device may be minimized.

DETAILED DESCRIPTION OF THE EXEMPLARY EMBODIMENTS

Figure 1:
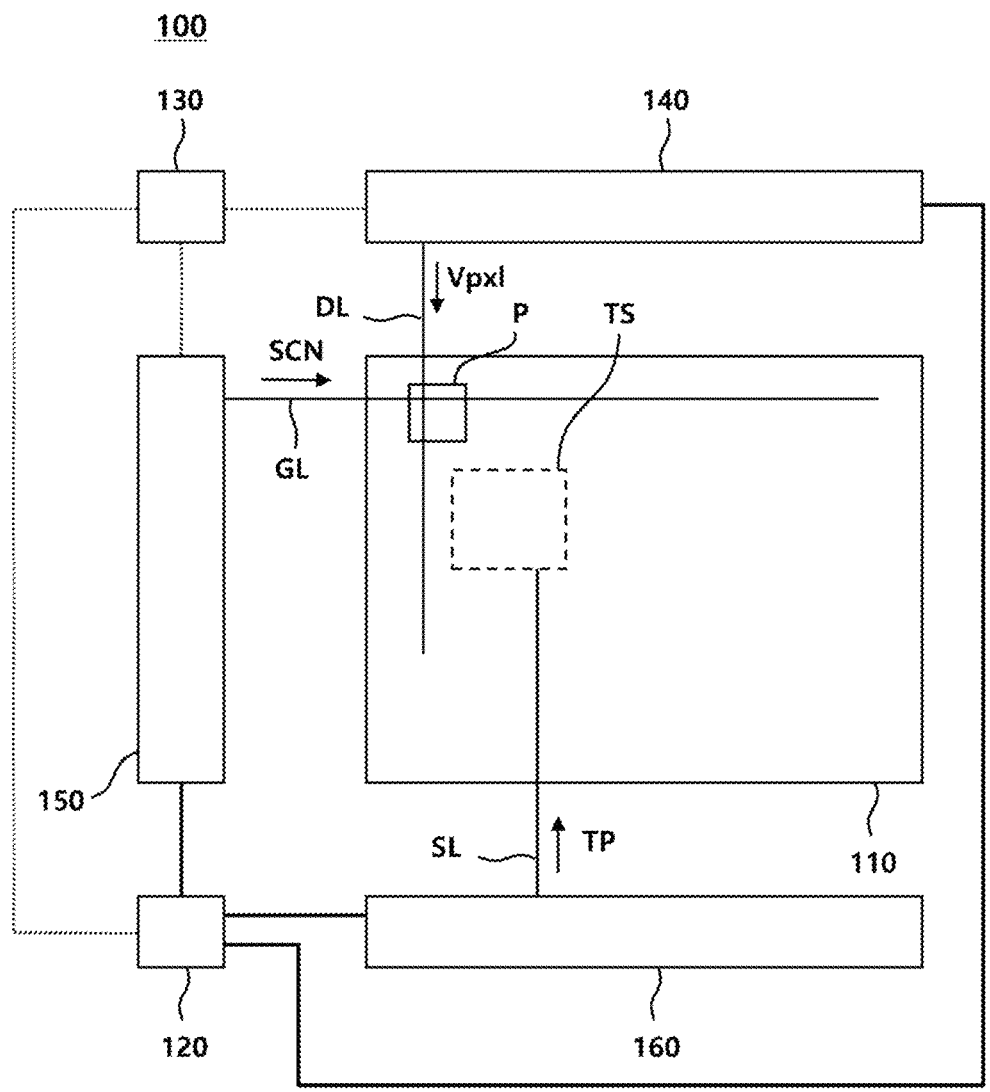
FIG. 1 is a configuration diagram of a display device in accordance with an embodiment.

FIG. 1 is a configuration diagram of a display device in accordance with an embodiment.

Referring to FIG. 1, a display device 100 may include a display panel 110, a power management device 120, a timing controller 130, a data driver device 140, a gate driver device 150, a touch driving device 160 and the like.

The display panel 110 serves to display an image. The display panel 110 may include a plurality of pixels P arranged therein, and an image may be displayed on the display panel 110 according to the brightness of each pixel P.

The display panel 110 may be a liquid crystal display (LCD) panel, an organic light emitting diode (OLED) panel or a micro LED panel.

The display device 100 may further include a touch panel which may be separated from the display panel 110 or integrated with the display panel 110. In the embodiment illustrated in FIG. 1, the touch panel is integrated with the display panel 110. Hereafter, for convenience of description, the case in which the touch panel is integrated with the display panel 110 will be taken as an example.

The touch panel may have touch electrodes TS arranged therein. When the touch panel is integrated with the display panel 110, each of the touch electrodes TS may be configured in the form of an in-cell touch electrode which is used for both pixel driving and touch sensing. The in-cell touch electrode may serve as a common electrode in an LCD panel or a cathode electrode in an OLED panel, for example.

In the LCD panel, the common electrode may supply a common voltage to each pixel. Furthermore, the common electrode may generate a sensing signal for a touch or approach of an external object to the display panel 110, while functioning as the touch electrode TS.

In the OLED panel, the cathode electrode may supply a ground voltage to an OLED. Furthermore, the cathode electrode may generate a sensing signal for a touch or approach of an external object on or to the display panel 110, while functioning as the touch electrode TS.

When the touch electrode TS is configured in the form of an in-cell touch electrode, the display device 100 may drive the display panel 110 in a time division manner. For example, the display device 100 may set a display time period and a touch time period as different time periods of one frame, and supply a voltage for pixel driving to the in-cell touch electrode in the display time period and supply a touch drive signal TP to the in-cell touch electrode in the touch time period.

For example, when the display panel 110 is a liquid crystal display panel, the display device 100 may supply a common voltage for pixel driving to the in-cell touch electrode in the display time period, and supply the touch drive signal TP for touch sensing to the in-cell touch electrode in the touch time period.

For another example, when the display panel 110 is an OLED panel, the display device 100 may supply a ground voltage for pixel driving to the in-cell touch electrode in the display time period, and supply the touch drive signal TP for touch sensing to the in-cell touch electrode in the touch time period.

The display device 100 may update an image in frame units. One frame time may be set to $1/120$, $1/60$, $1/30$ second or the like, and the display device 100 may update an image at each frame time.

In order to reduce power consumption, the display device 100 may adjust an image update period. For example, the display device 100 which has been updating an image in a period of $1/120$ second may update an image in a period of $1/60$ second, in order to reduce power consumption.

Substantially, the display device 100 may adjust the image update period by adjusting the frame time. One frame may include a display time period and a blank time period. The display device 100 may update an image in the display time period, and retain the image in the blank time period. Furthermore, the display device 100 may adjust the frame time by adjusting the length of the blank time period, thereby adjusting the image update period.

As such, the display device 100 may have various modes. For example, the display device 100 may have a display mode and a touch mode within one frame time, or have a display mode and a blank mode within one frame time. The display device 100 may additionally have more modes. For example, when the touch mode is a mode for finding a touch coordinate in detail, the display device 100 may further have a mode for determining only whether an external object has simply touched the display panel 110 or finding a touch location in wider area units each larger than one touch electrode. The mode may be a so-called low power touch mode.

The display device 100 may include a plurality of components which are operated in different states depending on modes. For example, while a common voltage is supplied to the common electrode in the display mode, a touch drive signal may be supplied to the common electrode in the touch mode. For another example, the display panel 110 may update an image in the display mode, but retain the image in the blank mode.

The display device 100 in accordance with an embodiment may supply optimized power to each of the components in each of the modes, thereby minimizing the power consumption.

The power management device 120 may be mainly involved in minimizing the power consumption.

The power management device 120 may include a plurality of power converting circuits. By using the power converting circuits, the power management device 120 may supply different types of power to the respective components of the display device 100. The types of power may be classified according to voltage levels or power levels. For example, two different voltage levels of power may be defined as two different types of power. Furthermore, two different power levels of power may be defined as different types of power.

A first power converting circuit may supply power having a first voltage level to a first component, and a second power converting circuit may supply power having a second voltage level to a second component.

The power management device 120 may differently control the operation states of the respective power converting circuits for each mode of the display device 100, thereby minimizing the power consumption of the display device 100.

For example, when a voltage outputted by the first power converting circuit is used only in the display time period, the power management device 120 may turn on the first power converting circuit in the display mode, and turn off the first power converting circuit in the touch mode.

For another example, the second power converting circuit may be involved in generating the touch drive signal TP. In this case, when the touch drive signal TP is generated at different voltage levels in the touch mode and the low power touch mode, the power management device 120 may control the output voltage of the second power converting circuit to a first voltage in the touch mode, and control the output voltage of the second power converting circuit to a second voltage in the low power touch mode.

The power management device 120 may turn off a power converting circuit which generates an unnecessary output voltage in each mode, or optimize the output voltage for each mode, thereby minimizing the power consumption.

The power management device 120 may receive a mode indication signal for mode recognition from the timing controller 130. The power management device 120 may include at least one input terminal, and receive the mode indication signal from the timing controller 130 through the at least one input terminal. Since the modes may be changed two or more times even within one frame time, the mode indication signal may be transmitted/received in a simple form.

For example, the power management device 120 may include two input terminals, and recognize four types of mode indication signals by combining a first signal transferred to a first input terminal and a second signal transferred to a second input terminal. For example, when the high-level first signal is inputted to the first input terminal and the high-level second signal is inputted to the second input terminal, the power management device 120 may recognize the corresponding mode as the display mode. Furthermore, when the low-level first signal is inputted to the first input terminal and the low-level second signal is inputted to the second input terminal, the power management device 120 may recognize the corresponding mode as the touch mode.

For another example, the power management device 120 may be connected to the timing controller 130 through digital communication such as inter-integrated circuit (I2C) communication, and receive a 1-byte mode indication signal through the digital communication.

In order to decide the operation states of the plurality of power converting circuits according to the simplified mode indication signal, the power management device 120 may store mode control values for the respective power converting circuits in advance. Furthermore, the power management device 120 may recognize the mode from the mode indication signal, and control or change the operation states of the respective power converting circuits according to the mode control values stored therein.

The power management device 120 may store the mode control values for the respective power converting circuits in a memory such as a register or electrically erasable and programmable read-only memory (EEPROM). In this state, when receiving the mode indication signal from the timing controller 130, the power management device 120 may read the mode control values, recognized according to the mode indication signal, from the memory, and then control the respective power converting circuits.

The display device 100 may include display driving devices configured to perform at least some functions for driving the display panel and touch driving devices configured to perform at least some functions for driving the touch panel. The power management device 120 may supply power to the display driving devices in the display mode, and not supply power to the display driving devices or reduce power supplied to the display driving devices in the touch mode, thereby reducing the power consumption.

The data driver device 140 and the gate driver device 150 may be display driving devices.

The data driver device 140 may receive image data from the timing controller 130, convert pixel data included in the image data into a pixel drive voltage Vpxl, and then supply the pixel drive voltage Vpxl to each pixel P through a data line DL.

The data driver device 140 may include a digital-analog converter (DAC) configured to convert pixel data into the pixel drive voltage Vpxl and a gamma voltage generation circuit configured to generate a plurality of gamma voltages by using a gamma reference voltage. The DAC may select one of the plurality of gamma voltages according to a grayscale value indicated by the pixel data, and generate the pixel drive voltage Vpxl. The gamma reference voltage may be supplied through one power converting circuit included in the power management device 120, and the power management device 120 may turn on one power converting circuit according to a first mode indication signal in the first time period where the power management device 120 operates in the display mode, and turn off the one power converting circuit according to a second mode indication signal in the second time period where the power management device 120 operates in the touch mode or blank mode.

The gate driver device 150 may supply a scan signal SCN to the gate line GL, and select lines to receive the pixel drive voltage Vpxl in the display panel 110.

The gate driver device 150 may supply the scan signal SCN corresponding to a gate high voltage to a gate line GL which corresponds to a line to receive the pixel drive voltage Vpxl in the display mode. The gate high voltage may be supplied by another power converting circuit of the power management device 120.

The gate high voltage may also be used in the touch mode. When supplying the touch drive signal TP to the touch electrode TS, the touch driving device 160 may generate an auxiliary signal having the same phase as the touch drive signal TP by using the gate high voltage, and supply the auxiliary signal to the gate line GL. Then, the parasitic capacitance between the gate line GL and the touch electrode TS may be reduced, which makes it possible to increase the sensitivity for touch sensing.

The display device 100 may reduce the power consumption by stopping the supply of the auxiliary signal in the low power touch mode, and the power management device 120 may turn off the another power converting circuit in order not to generate the gate high voltage in the low power touch mode.

The touch driving device 160 may supply the touch drive signal TP to the touch electrode TS through a sensing line SL, and receive a reaction signal to the touch drive signal TP, thereby sensing a touch.

The touch driving device 160 may supply different touch drive signals TP in the touch mode and the low power touch mode. For example, the touch driving device 160 may supply a first touch drive signal to the touch electrode TS in the touch mode, and supply a second touch drive signal to the touch electrode TS in the low power touch mode.

The touch driving device 160 may individually supply the first touch drive signal to each of the touch electrodes TS in the touch mode, and connect a plurality of touch electrodes TS and then supply the second touch drive signal to the plurality of touch electrodes TS in the low power touch mode. At this time, the voltage level of the second touch drive signal may be lower than the voltage level of the first touch drive signal.

The power management device 120 may supply the touch drive voltage to the touch driving device 160, and the touch driving device 160 may generate the touch drive signal TP by using the touch drive voltage. The power management device 120 may control an output voltage of still another power converting circuit to a first voltage and supply the first voltage to the touch driving device 160 in the touch mode, and the control an output voltage of yet another power converting circuit to a second voltage and supply the second voltage to the touch driving device 160 in the low power touch mode. The second voltage may be lower than the first voltage.

The timing controller 130 may transmit a timing signal to the driver devices such as the data driver device 140, the gate driver device 150 and the touch driving device 160. The timing signal may include information on a mode. For example, the data driver device 140 may distinguish between the display mode and the blank mode according to the timing signal, and the touch driving device 160 may distinguish between the display mode and the touch mode according to the timing signal.

The timing controller 130 may output the mode indication signal to the power management device 120. The timing controller 130 may output the first mode indication signal to the power management device 120 in the first time period, and output the second mode indication signal to the power management device 120 in the second time period.

A display device in accordance with an embodiment may include: a display driving device configured to perform at least some functions for driving a display panel; a timing controller configured to output a first mode indication signal in a first time period and output a second mode indication signal in a second time period; a first power converting circuit connected to the display driving device through a first output terminal; a power management device configured to acquire a first mode control value from a memory according to the first mode indication signal, acquire a second mode control value from the memory according to the second mode indication signal, control the operation state of the first power converting circuit according to the first mode control value in the first time period, and control the operation state of the first power converting circuit according to the second mode control value in the second time period; and a touch driving device configured to perform at least some functions for driving a touch panel. Hereafter, examples of the components included in the display device will be described.

Figure 2:
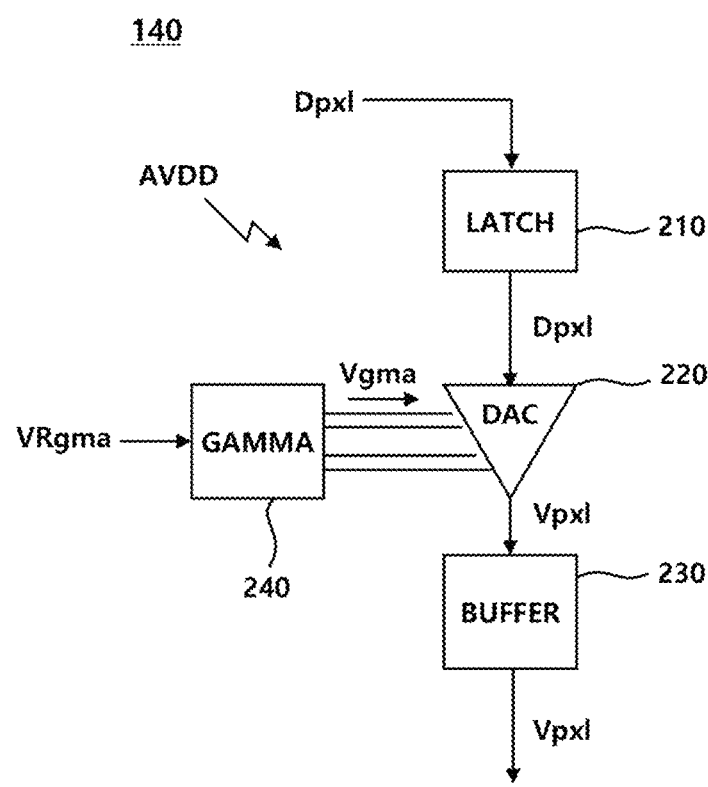
FIG. 2 is a configuration diagram of a data driver device in accordance with an embodiment.

FIG. 2 is a configuration diagram of a data driver device in accordance with an embodiment.

Referring to FIG. 2, the data driver device 140 may include a latch circuit 210, a DAC 220, a buffer circuit 230, a gamma voltage generation circuit 240 and the like.

The latch circuit 210 may temporarily latch pixel data Dpxl received from the timing controller.

The DAC 220 may convert the pixel data Dpxl, latched in the latch circuit 210, into a pixel drive voltage Vpxl.

The buffer circuit 230 may supply the pixel drive voltage Vpxl to each pixel through a data line.

The gamma voltage generation circuit 240 may receive a gamma reference voltage VRgma from the power management device, and generate a plurality of gamma voltages Vgma by using the gamma reference voltage VRgma. Furthermore, the DAC 220 may select one voltage of the plurality of gamma voltages Vgma according to a grayscale value checked through the pixel data Dpxl, and generate the pixel drive voltage Vpxl.

The DAC 220 may convert the pixel data Dpxl into the pixel drive voltage Vpxl in the display mode. Thus, the power management device may turn on a power converting circuit in the display mode, and turn off the power converting circuit in the touch mode, the blank mode or the low power touch mode, the power converting circuit serving to generate the gamma reference voltage VRgma.

The data driver device 140 may receive a data drive voltage AVDD and drive some components. For example, the data driver device 140 may drive the latch circuit 210, the DAC 220 and the buffer circuit 230 by using the data drive voltage AVDD as power.

The latch circuit 210 may receive and latch the pixel data Dpxl in a mode which is not the display mode, for example, the blank mode. The DAC 220 and the buffer circuit 230 may supply the pixel drive voltage Vpxl to a pixel while operating in the display mode. Thus, the data drive voltage AVDD may be supplied in both the display mode and the blank mode. However, the power consumption in the blank mode is smaller than in the other modes. Therefore, in the display mode, a power converting circuit of the power management device, which supplies the data drive voltage AVDD, may supply power having a lower power level than in the blank mode. Furthermore, in the low power touch mode, the power converting circuit may be turned off.

The data driver device 140 may update an image, displayed on the display panel, in the display period, and retain an image, displayed on the display panel, in the touch period. The power management device may supply power involved in the image update, by using one circuit. In this case, the power management device may turn on the power converting circuit according to the first mode indication signal in the display period, and turn off the power converting circuit according to the second mode indication signal in the blank period. The power converting circuit may supply a gamma reference voltage to the data driver device 140.

Figure 3:
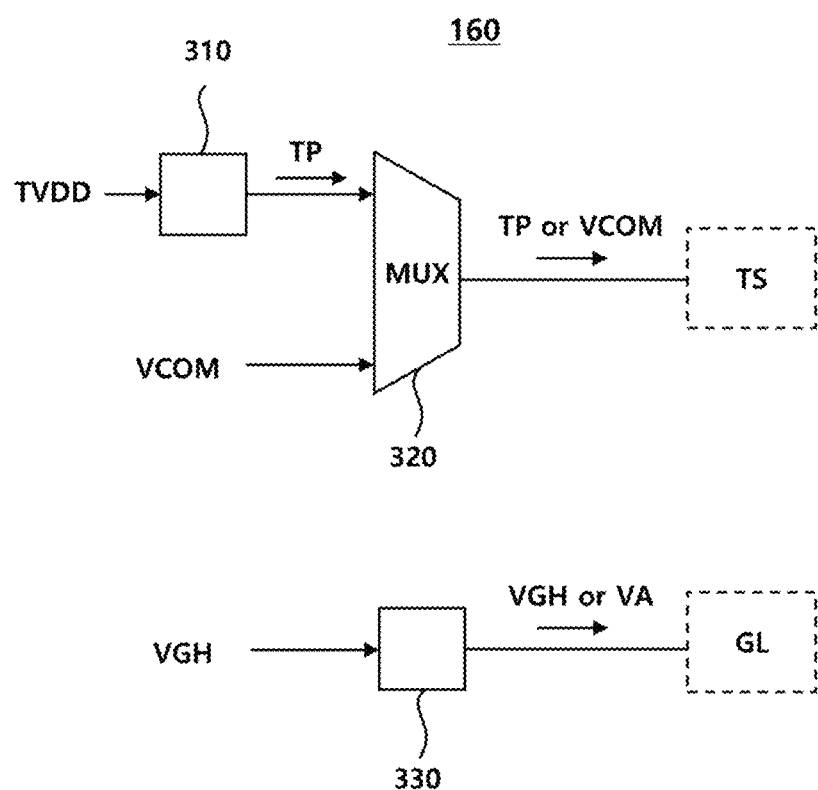
FIG. 3 is a configuration diagram of a touch driving device in accordance with an embodiment.

FIG. 3 is a configuration diagram of a touch driving device in accordance with an embodiment.

Referring to FIG. 3, the touch driving device 160 may include a touch drive signal generation circuit 310, a MUX 320, an auxiliary signal generation circuit 330 and the like.

The touch driving device 160 may perform at least some functions for driving the touch panel. For example, the touch driving device 160 may supply the touch drive signal TP to the touch electrode TS or supply an auxiliary signal VA to the gate line GL.

When the touch electrode TS is an in-cell touch electrode, a voltage involved in display driving, such as a common voltage VCOM, may be supplied to the touch electrode TS in the display mode, and the touch drive signal TP may be supplied to the touch electrode TS in the touch mode.

The touch drive signal generation circuit 310 may receive a touch drive voltage TVDD from one power converting circuit of the power management device, and generate the touch drive signal TP by using the touch drive voltage TVDD.

The MUX 320 may receive the touch drive signal TP and the common voltage VCOM, select one of the received signals, and supply the selected signal to the touch electrode TS. According to a timing signal for distinguishing between the display mode and the touch mode, the MUX 320 may select the common voltage VCOM and supply the common voltage VCOM to the touch electrode TS in the display mode, and select the touch drive signal TP and supply the touch drive signal TP to the touch electrode TS in the touch mode.

The auxiliary signal generation circuit 330 may generate the auxiliary signal VA having substantially the same phase as the touch drive signal TP by using a gate high voltage VGH and supply the auxiliary signal VA to the gate line GL, in the touch period.

The auxiliary signal generation circuit 330 may not supply the auxiliary signal VA to the gate line GL in a time period corresponding to the low power touch mode. Through this configuration, a power converting circuit that outputs the gate high voltage VGH may be turned on in the display mode and the touch mode, and turned off in the low power mode and the blank mode.

The touch drive signal TP may have different voltage levels in the touch mode and the low power mode, and the touch drive signal generation circuit 310 may supply the first touch drive signal to the touch electrode TS in the touch period, and supply the second touch drive signal to the touch electrode TS in a time period corresponding to the low power mode. At this time, the voltage level of the second touch drive signal may be lower than the voltage level of the first touch drive signal. Furthermore, the power converting circuit that supplies the touch drive voltage TVDD may control the touch drive voltage TVDD to a first voltage in the touch period according to the mode indication signal indicating the touch mode, and control the touch drive voltage TVDD to a second voltage lower than the first voltage according to the mode indication signal indicating the low power touch mode.

Figure 4:
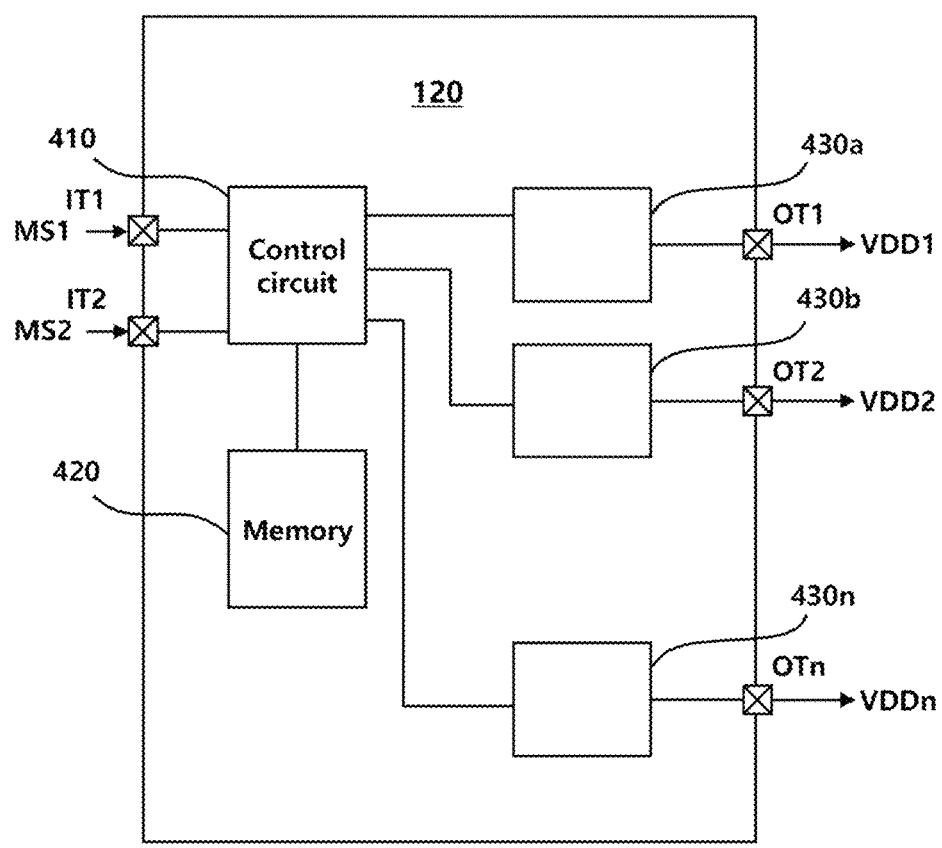
FIG. 4 is a configuration diagram of a power management device in accordance with an embodiment.

FIG. 4 is a configuration diagram of a power management device in accordance with an embodiment.

Referring to FIG. 4, the power management device 120 may include one or more input terminals IT1 and IT2, a plurality of output terminals OT1 to OTn, a plurality of power converting circuits (PCC1 to PCCn) 430a to 430n, a memory 420, a control circuit 410 and the like.

The control circuit 410 may receive mode indication signals MS1 and MS2 through the one or more input terminals IT1 and IT2. For example, the control circuit 410 may receive first and second mode indication signals through the one or more input terminals IT1 and IT2 in different time periods.

The output terminals OT1 to OTn may be connected to different components of the display device. For example, the first output terminal OT1 may be connected to the display driving device, and the second output terminal OT2 may be connected to the touch driving device.

The power converting circuits 430a to 430n may output different types of power to the output terminals OT1 to OTn. For example, the power converting circuits 430a to 430n may output different voltage levels or different power levels of power to the output terminals OT1 to OTn.

The memory 420 may store mode control values for the respective power converting circuits 430a to 430n.

The control circuit 410 may acquire the mode control values for the respective power converting circuits 430a to 430n from the memory 420 according to the mode indication signal, and control or change the operation states of the respective power converting circuits 430a to 430n according to the mode control values. For example, the control circuit 410 may acquire first mode control values of the respective power converting circuits 430a to 430n from the memory 420 according to the first mode indication signal and control the operation states of the respective power converting circuits 430a to 430n to a first state according to the first mode control values. Furthermore, the control circuit 410 may acquire second mode control values of the respective power converting circuits 430a to 430n from the memory 420 according to the second mode indication signal, and change the operation states of the respective power converting circuits 430a to 430n to a second state according to the second mode control values.

For example, the control circuit 410 may turn on a first power converting circuit 430a of the power converting circuits 430a to 430n according to the first mode indication signal, and turn off the first power converting circuit 430a according to the second mode indication signal.

For another example, the control circuit 410 may control the output voltage of a second power converting circuit 430b of the power converting circuits 430a to 430n to the first voltage according to the first mode indication signal, and control the output voltage of the second power converting circuit 430b to the second voltage according to the second mode indication signal.

The memory 420 may store a mode on/off control value for the first power converting circuit 430a and a mode output voltage control value for the second power converting circuit 430b, and the control circuit 410 may control the on/off state of the first power converting circuit 430a according to the mode on/off control value, and control the output voltage of the second power converting circuit 430b according to the mode output voltage control value.

The control circuit 410 may recognize four kinds of mode indication signals by combining a first signal MS1 transferred to the first input terminal IT1 and a second signal MS2 transferred to the second input terminal IT2. The four kinds of mode indication signals may indicate the display mode, the touch mode, the blank mode and the low power touch mode, for example.

The display device may include an in-cell touch electrode which is used for both pixel driving and touch sensing. The first power converting circuit 430a of the power converting circuits 430a to 430n may supply a common voltage for pixel driving to the in-cell touch electrode, and the control circuit 410 may turn on the first power converting circuit 430a in the first time period according to the first mode indication signal, and turn off the first power converting circuit 430a in the second time period according to the second mode indication signal.

The second power converting circuit 430b may be a circuit for supplying a gamma reference voltage, and the control circuit 410 may turn on the second power converting circuit 430b in the first time period according to the first mode indication signal, and turn off the second power converting circuit 430b in the second time period according to the second mode indication signal.

A third power converting circuit (not illustrated) may supply a touch drive voltage. In the low power touch mode, the third power converting circuit may control the touch drive voltage to a voltage lower than in the touch mode.

A fourth power converting circuit (not illustrated) may supply a gate high voltage.

The fourth power converting circuit may be turned on in the display mode and the touch mode, and turned off in the blank mode and the low power touch mode.

Figure 5:
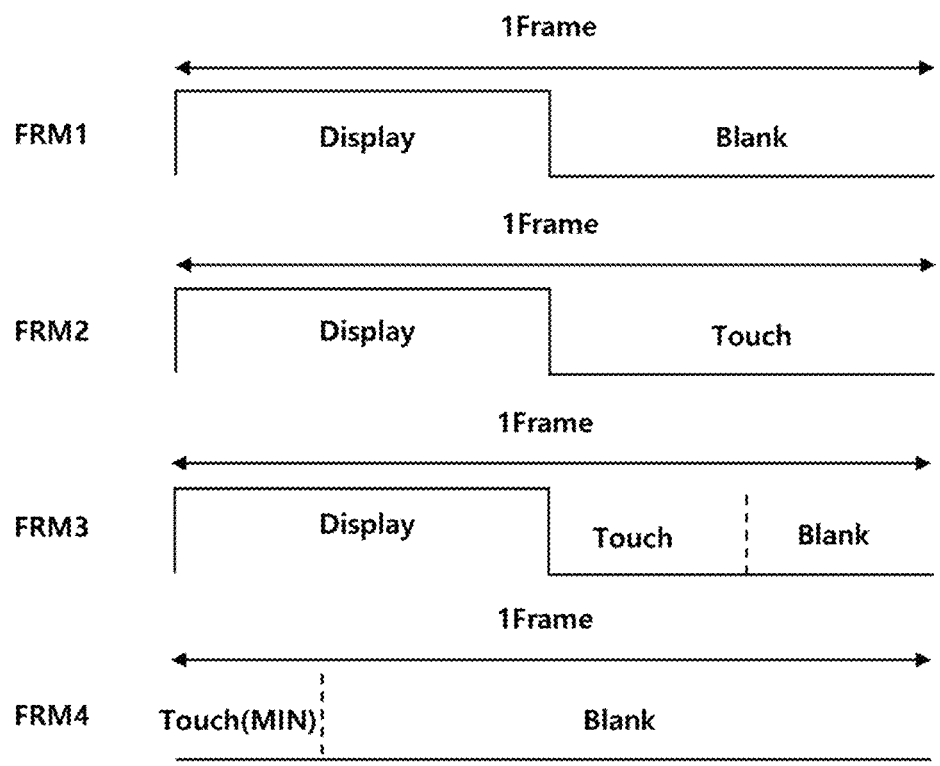
FIG. 5 is a timing diagram illustrating modes in four exemplary frames.

FIG. 5 is a timing diagram illustrating modes in four exemplary frames.

FIG. 5 illustrates four exemplary frames FRM1 to FRM4 which are successively arranged, and spaced apart from each other in terms of time. [99] Referring to a first frame FRM1, one frame may be divided into the display mode and the blank mode. Referring to a second frame FRM2, one frame may be divided into the display mode and the touch mode. Referring to a third frame FRM3, one frame may be divided into the display mode, the touch mode and the blank mode. Referring to a fourth frame FRM4, one frame may be divided into the low power mode and the blank mode.

Referring to FIG. 5, the power management device may receive two or more mode indication signals for each frame, the indication signals indicating the corresponding modes. One frame time may be set to $\frac{1}{60}$, $\frac{1}{120}$ or $\frac{1}{30}$ second. When an output of the mode indication signal is changed one or more times within one frame time, the mode indication signal is changed at a very short time interval.

When the mode indication signal which is quickly changed is transmitted/received through complex communication, the corresponding mode may not be accurately changed by signal delay, communication error or the like. The display device in accordance with the present embodiment may remove such a problem through a simple signal transmitting/receiving method.

For example, the timing controller and the power management device may be connected through two signal lines, and the timing controller may transmit four kinds of mode indication signals through the two signal lines. The four kinds of mode indication signals which indicate 00, 01, 10 and 11 according to the voltage levels of the two signal lines may be stably and quickly transmitted/received.

For another example, the timing controller and the power management device may be connected through digital communication, and the timing controller may transmit a 1-byte mode indication signal to the power management device through digital communication. Although a head and tail are included in one byte, the timing controller may stably and quickly transmit the four kinds of mode indication signals by using two bits.

Figure 6:
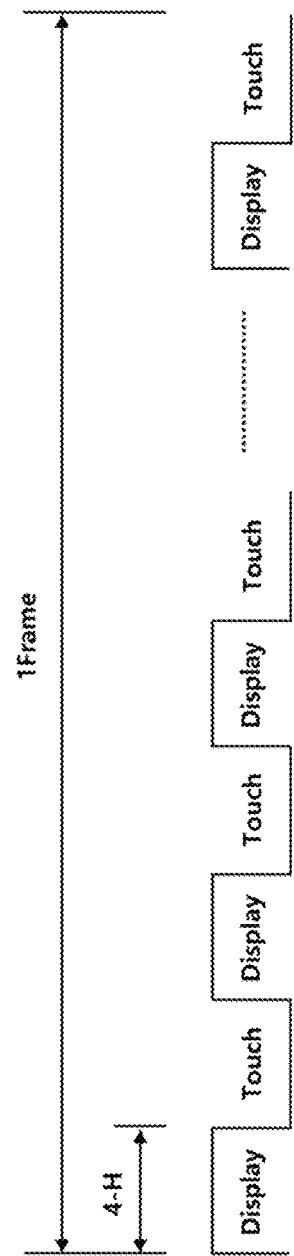
FIG. 6 is a timing diagram illustrating a mode in another exemplary frame.

FIG. 6 is a timing diagram illustrating a mode in another exemplary frame.

Referring to FIG. 6, one frame may include a plurality of display periods and a plurality of touch periods. The timing controller may alternately output a plurality of first mode indication signals indicating the display periods and a plurality of second mode indication signals indicating the touch periods within one frame, in order to indicate the corresponding modes in the respective periods to the power management device.

In terms of time, the timing controller may output the first mode indication signals and then output the second mode indication signal, during M-H (Horizontal) time required for driving M gate lines where M is a natural number, e.g. 4. In this way, 16 touch periods may be included in one frame.

Figure 7:
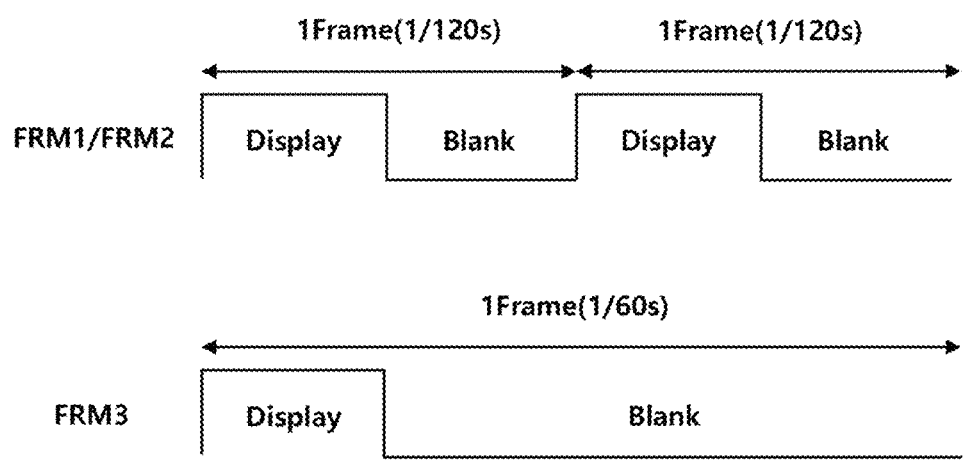
FIG. 7 is a timing diagram illustrating modes in other exemplary frames.

FIG. 7 is a timing diagram illustrating modes in other exemplary frames.

Referring to FIG. 7, each of first to third frames FRM1 to FRM3 may be composed of the display period and the blank period. The first and second frames FRM1 and FRM2 may each have a length of $1/120$ second, and the third frame FRM3 may have a length of $1/60$ second.

The display driving device may update an image displayed in the display period, and retain the image in the blank period, and the timing controller may adjust the length of the blank period by using the timing signal, and thus adjust the update period of the image through the adjusted blank period. For example, the timing controller may control the timing signal such that the length of the blank period in the third frame FRM3 becomes larger than that in the first and second frames FRM1 and FRM2. Accordingly, the timing controller may generate the mode indication signal and transmit the mode indication signal to the power management device.

In accordance with the above-described present embodiment, the power consumption of the display device may be minimized. Furthermore, in accordance with the present embodiment, while the mode of the power management device is quickly changed, the output of the power management device may be optimized for each mode. Furthermore, in accordance with the present embodiment, while signals are stably transmitted to/received from the power management device, a malfunction of the power management device may be minimized.

What is claimed is:

1. A power management device comprising:
one or more input terminals configured to receive a first mode indication signal and a second mode indication signal from a timing controller in different time periods;
a plurality of output terminals connected to different components of a display device;
a plurality of power converting circuits configured to output different types of power to the plurality of output terminals;
a memory configured to store control values for respective power converting circuits regarding respective modes; and
a control circuit configured to acquire first mode control values of the respective power converting circuits from the memory according to the first mode indication signal and control operation states of the respective power converting circuits to be a first state according to the first mode control values, and to acquire second mode control values of the respective power converting circuits from the memory according to the second mode indication signal and change the operation states of the respective power converting circuits to a second state according to the second mode control values.

2. The power management device of claim 1, wherein the control circuit controls among the power converting circuits a first power converting circuit to be ON according to the first mode indication signal and controls the first power converting circuit to be OFF according to the second mode indication signal.

3. The power management device of claim 1, wherein the control circuit controls an output voltage of a second power converting circuit of the power converting circuits to be a first voltage according to the first mode indication signal and controls an output voltage of the second power converting circuit to be a second voltage according to the second mode indication signal.

4. The power management device of claim 1, wherein the memory stores ON/OFF control values for a first power converting circuit regarding the respective modes and output voltage control values for a second power converting circuit regarding the respective modes,
wherein the control circuit controls an on/off state of the first power converting circuit according to the ON/OFF control values regarding the respective modes and controls an output voltage of the second power converting circuit according to the output voltage control values regarding the respective modes.

5. The power management device of claim 1, wherein the one or more input terminals comprise a first input terminal and a second input terminal and the control circuit recognizes four kinds of mode indication signals obtained by combining a first signal transferred through the first input terminal and a second signal transferred through the second input terminal.

6. The power management device of claim 1, wherein the display device comprises an in-cell touch electrode which is used for both pixel driving and touch sensing,
a first power converting circuit of the power converting circuits supplies a common voltage for the pixel driving to the in-cell touch electrode, and
the control circuit controls the first power converting circuit to be in an ON state according to the first mode indication signal in a pixel driving time period, and controls the first power converting circuit to be in an OFF state according to the second mode indication signal in a touch sensing time period.

7. A display device comprising:
a display driving device configured to perform at least some functions for driving a display panel;
a timing controller configured to output a first mode indication signal in a first time period and to output a second mode indication signal in a second time period; and
a power management device comprising a first power converting circuit connected to the display driving device through a first output terminal and configured to acquire a first mode control value from a memory according to the first mode indication signal, to acquire a second mode control value from the memory according to the second mode indication signal, to control an operation state of the first power converting circuit according to the first mode control value in the first time period, and to control an operation state of the first power converting circuit according to the second mode control value in the second time period.

8. The display device of claim 7, wherein the display driving device updates an image displayed on the display panel in the first time period and retains the image in the second time period.

9. The display device of claim 8, wherein the power management device controls the first power converting circuit to be in an ON state in the first time period according to the first mode indication signal and controls the first power converting circuit to be in an OFF state in the second time period according to the second mode indication signal.

10. The display device of claim 9, wherein the display driving device receives a gamma reference voltage by the first power converting circuit.

11. The display device of claim 7, further comprising a touch driving device configured to perform at least some functions for driving a touch panel,
wherein, in the first time period, the display driving device supplies a gate high voltage to a gate line disposed in the display panel by using the first power converting circuit and,
in the second time period, the touch driving device supplies a first touch drive signal to the touch panel, generates an auxiliary signal having substantially the same phase as the first touch drive signal by using the gate high voltage, and supplies the auxiliary signal to the gate line.

12. The display device of claim 11, wherein, in a third time period, the touch driving device supplies a second touch drive signal to the touch panel and the power management device controls the first power converting circuit to be in an OFF state.

13. The display device of claim 12, wherein the second touch drive signal has a lower voltage level than that of the first touch drive signal.

14. The display device of claim 7, wherein the display driving device updates an image displayed on the display panel in the first time period and retains the image in the second time period, and
the timing controller adjusts a period of updating the image by adjusting the length of the second time period.

15. The display device of claim 7, wherein the timing controller outputs a plurality of first mode indication signals and a plurality of second mode indication signals in one frame in a way of alternately outputting a second mode indication signal after outputting a first mode indication signal during an M-H (Horizontal) time required for driving M gate lines (M is a natural number).

16. The display device of claim 7, wherein the timing controller and the power management device are connected through two signal lines,
wherein the timing controller transmits four kinds of mode indication signals through the two signal lines.

17. The display device of claim 7, wherein the timing controller and the power management device are connected through digital communication,
wherein the timing controller transmits a 1-byte of a mode indication signal to the power management device through the digital communication.

18. The display device of claim 7, wherein one frame time is 1/60, 1/120 or 1/30 second,
wherein the timing controller changes an output of the mode indication signal at least one time within one frame time.

19. The display device of claim 7, wherein the power management device controls an output voltage of the first power converting circuit to be a first voltage in the first time period according to the first mode indication signal and controls an output voltage of the first power converting circuit to be a second voltage in the second time period according to the second mode indication signal.

20. The display device of claim 7, wherein the display panel comprises an in-cell touch electrode which is used for both pixel driving and touch sensing,
wherein the power management device controls the first power converting circuit to be in an ON state according to the first mode indication signal in the first time period and controls the first power converting circuit to be in an OFF state according to the second mode indication signal in the second time period.

* * * * *